(12) United States Patent
Sturdee

(10) Patent No.: US 8,398,132 B2
(45) Date of Patent: Mar. 19, 2013

(54) VEHICLE PROTECTION DEVICE

(76) Inventor: Desmond Wilfred Sturdee, London (GB)

( * ) Notice: Subject to any disclaimer, the term of this patent is extended or adjusted under 35 U.S.C. 154(b) by 0 days.

(21) Appl. No.: 13/126,074

(22) PCT Filed: Oct. 29, 2009

(86) PCT No.: PCT/EP2009/064316
§ 371 (c)(1),
(2), (4) Date: Apr. 26, 2011

(87) PCT Pub. No.: WO2010/049502
PCT Pub. Date: May 6, 2010

(65) Prior Publication Data
US 2011/0221212 A1    Sep. 15, 2011

(30) Foreign Application Priority Data
Oct. 29, 2008 (GB) .................... 0819824.4

(51) Int. Cl.
*B60R 19/42* (2006.01)
(52) U.S. Cl. ...................................................... 293/126
(58) Field of Classification Search .................. 293/127, 293/126
See application file for complete search history.

(56) References Cited

U.S. PATENT DOCUMENTS

| | | | | |
|---|---|---|---|---|
| 2,785,921 A | * | 3/1957 | Barenyi | 296/216.02 |
| 2,790,674 A | * | 4/1957 | Barenyi | 296/181.5 |
| 2,986,419 A | * | 5/1961 | Barenyi | 293/121 |
| 2,994,356 A | | 8/1961 | Fleming | |
| 3,036,652 A | * | 5/1962 | Barenyi | 180/54.1 |
| 3,110,515 A | * | 11/1963 | Loftin | 293/127 |
| 4,127,294 A | | 11/1978 | Cooper | |
| 4,493,502 A | | 1/1985 | Campbell, Jr. | |
| 4,796,935 A | | 1/1989 | Maraia | |
| 4,879,543 A | | 11/1989 | Smith, Sr. | |
| 5,035,938 A | | 7/1991 | Truett | |
| 5,193,877 A | | 3/1993 | George, Jr. | |
| 5,975,599 A | * | 11/1999 | Goldstein | 293/128 |
| 6,179,354 B1 | * | 1/2001 | Bennett, Jr. | 293/128 |
| 6,203,095 B1 | | 3/2001 | Peterson | |
| 6,247,734 B1 | | 6/2001 | Hamilton et al. | |
| 6,719,339 B1 | * | 4/2004 | Yoham | 293/128 |
| 2004/0178618 A1 | * | 9/2004 | Rhea et al. | 280/770 |
| 2005/0099026 A1 | * | 5/2005 | Velazquez | 293/128 |

FOREIGN PATENT DOCUMENTS

| | | |
|---|---|---|
| CA | 2227253 | 7/1999 |
| DE | 858506 | 12/1952 |
| FR | 2892980 | 5/2007 |
| GB | 2281718 | 3/1995 |
| GB | 2457728 | 8/2009 |
| JP | 11059198 | 3/1999 |
| JP | 2003328575 | 11/2003 |
| WO | 2009054782 | 4/2009 |

OTHER PUBLICATIONS

Search Report dated Oct. 12, 2009, issued in related Great Britain Application No. 0819824.4.
International Search Report dated Mar. 16, 2010, issued in related International Patent Application No. PCT/EP2009/064316.
Office Action issued on Aug. 23, 2012, in related corresponding European Patent Application No. 09744680.1-1268.

* cited by examiner

*Primary Examiner* — Lori Lyjak
(74) *Attorney, Agent, or Firm* — Onello & Mello, LLP

(57) ABSTRACT

A vehicle protection device includes a strip of resilient, impact-absorbing material in the form of a band. The strip of material extends around the entire vehicle: front, rear, and both sides. The band may be held in place, for example, by the resiliency of the impact-absorbing of the material.

10 Claims, 3 Drawing Sheets

VEHICLE PROTECTION DEVICE

BACKGROUND OF INVENTION (1) Field of Invention

The present invention relates to a vehicle protection device.

(2) Description of Related Art including information disclosed under 37 CFR 1.97 and 1.98

Damage of one stationary vehicle, such as a parked car, by opening of another car's door into the side of the first is an acknowledged problem, sometimes addressed by fitting of rubbing strips to car doors.

For instance in US Pat. No. 5,035,938 there is disclosed a kit which has a number of protective covers of a generally U-shaped cross section to be frictionally snapped about the decorative moulding, trim, or other component of an automobile, to protect the textured decorative trim components from an application of wax when the car is waxed, for protection and beautification.

Also in US Pat. No. 4,879,543 there is disclosed an apparatus for protecting the finish on the door of an automobile from damage caused by someone opening the door of an automobile parked in the adjoining parking space. The device includes a transparent housing wherein a plurality of arcuate protective strips are deployed therein. Said arcuate protective strips including a guide track or channel located along the intermediate section thereof, said arcuate protective strips also including T-shaped flanges substantially deployed along the opposite ends of each arcuate protective strip, whereby said guide track or channel and said T-shaped flanges allow said plurality of said arcuate protective strips to extend along the longitudinal portion of the door of the automobile. Also provided is a tensile retention band wherein said device may be selectively retracted into said transparent housing. Pivotally affixed hook members provide axial displacement of the device between the longitudinal portion of the car door and the marginal portion of the flanged end of the car door.

These proposals do not address the protection of other vulnerable parts of a car to damage in a carpark, which can be caused not only by the doors of other cars but also by push chairs, luggage and shopping moved between cars for instance.

BRIEF SUMMARY OF INVENTION

The object of the present invention is to provide an improved vehicle protection device.

According to a first aspect of the invention there is provided a vehicle protection device comprising a strip of impact absorbing material and means for attaching it temporarily in position along the side of a vehicle, wherein the strip is in the form of a flexible resilient continuous band and wherein the attachment means is constituted by the resilience of the band.

The strip is in the form of a band sized to extend not only along the two sides of a vehicle but across the front and the rear as well. The attachment means is constituted by the resilience of the band and the fact that it is preferably slightly smaller in its free state than the circumference of the vehicle. For example, the band may be from 100 mm to 400 mm shorter than the circumference of the vehicle. Alternatively, it can be provided with a resilient section, of elasticised material. Again, it can be provided with a manually tightenable section, typically using jamming cleats.

While the elasticity of the band may be sufficient to retain the band in position about the vehicle, in a less preferred embodiment the attachment means can additionally comprise one or more suction cups located along the length of the strip. Typically, the suction cups can be attached to headlight glass at the front of the vehicle and the rear valance at the back of the vehicle. The suction cups may be of the type having a lever actuatable to draw a vacuum ensuring attachment of the suction cups to a headlight and a rear valance. The cups may have integrally moulded bars around which the strip is threaded for maintaining tension in it.

The strip may be of a square, rectangular, triangular, circular, semi-circular or other cross-section, although a rectangular cross-section is preferred. The cross-section dimensions of the strip are preferably from 100 mm to 750 mm in height by from 5 to 20 mm in thickness. The strip is preferably straight. The strip may be provided with broad sections, to protect more vulnerable parts of the vehicle, and multiple (e.g. double) narrower sections there-between.

The strip may be formed of elastomeric material, typically a foamed material, especially a closed cell foam, and is non-pneumatic. Suitable materials include synthetic rubbers such as neoprene (Trade Name) or ethylene vinyl acetate (EVA) foam. In a less convenient embodiment, the band is at least partly hollow, and means are provided to inflate the band.

The band may be of a coloured material, for example to match that of the vehicle, or of a transparent material.

According to a second aspect of the invention, there is provided a vehicle protection device comprising at least one strip of impact absorbing material wound onto a floor mounted or wall mounted drum, the strip being in the form of a flexible resilient material, cooperating attachment means being provided on a free end of the strip and on a fixed position, enabling the strip to be unwound from the drum, placed along one side, across the front or rear and along the other side of a parked vehicle, with the free end of said strip being attached to the fixed position by said cooperating attachment means.

The parked vehicle will usually be located adjacent the wall of the garage or carpark. The drum may, for example, be mounted on the garage or carpark wall in a releasable manner (enabling the drum to be portable and therefore capable of being stored in the car itself when not in use) or may be integrated into a space within the wall. The cooperating attachment means provided on a free end of the strip may comprise a hook, to secure the free end onto a corresponding hook on the garage or carpark wall. The invention is also applicable to the protection of vehicles in transit, for example when being carried on a transporter.

Thus, the strip of the protection device is envisaged to be pulled out from the drum on the garage/carpark wall. The drum can be in the form of a winch provided with a handle for rewinding, with which the strip can be tightened around the vehicle.

The device can be fitted over a vehicle cover or indeed it can be incorporated with a vehicle cover, for example with the strip being embedded within the material of the vehicle cover.

BRIEF DESCRIPTION OF SEVERAL VIEWS OF THE DRAWING(S)

To help understanding of the invention, a specific embodiment thereof will now be described by way of example and with reference to the accompanying illustrative drawings, in which.

DETAILED DESCRIPTON OF THE INVENTION

Figure 1:
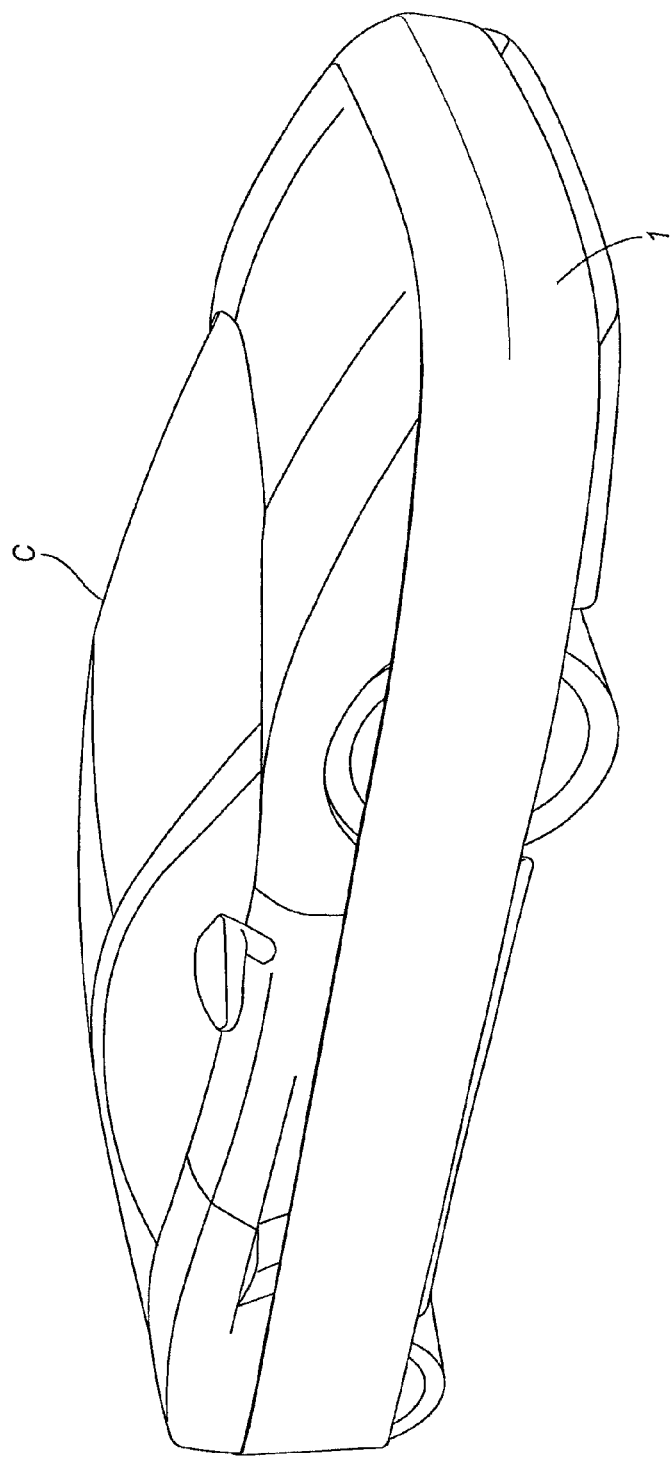
FIG. 1 is a perspective view of a car fitted with the device according a first aspect of the present invention.

Referring first to FIG. 1 of the drawings, a car C is valuable and liable to be stored in garage parking where it is liable to be damaged.

To protect it, a protection device of the invention is fitted around the car, along the sides, including the doors, and across the front and the back.

The device is a band 1 of R450 E.V. cross-linked polyolefin extruded closed cell foam material, with a 500 mm by 8 mm cross-section. Where the band is sized for the car, its free extent is 200 mm shorter than the distance around the car at the intended fitting height.

Figure 2:
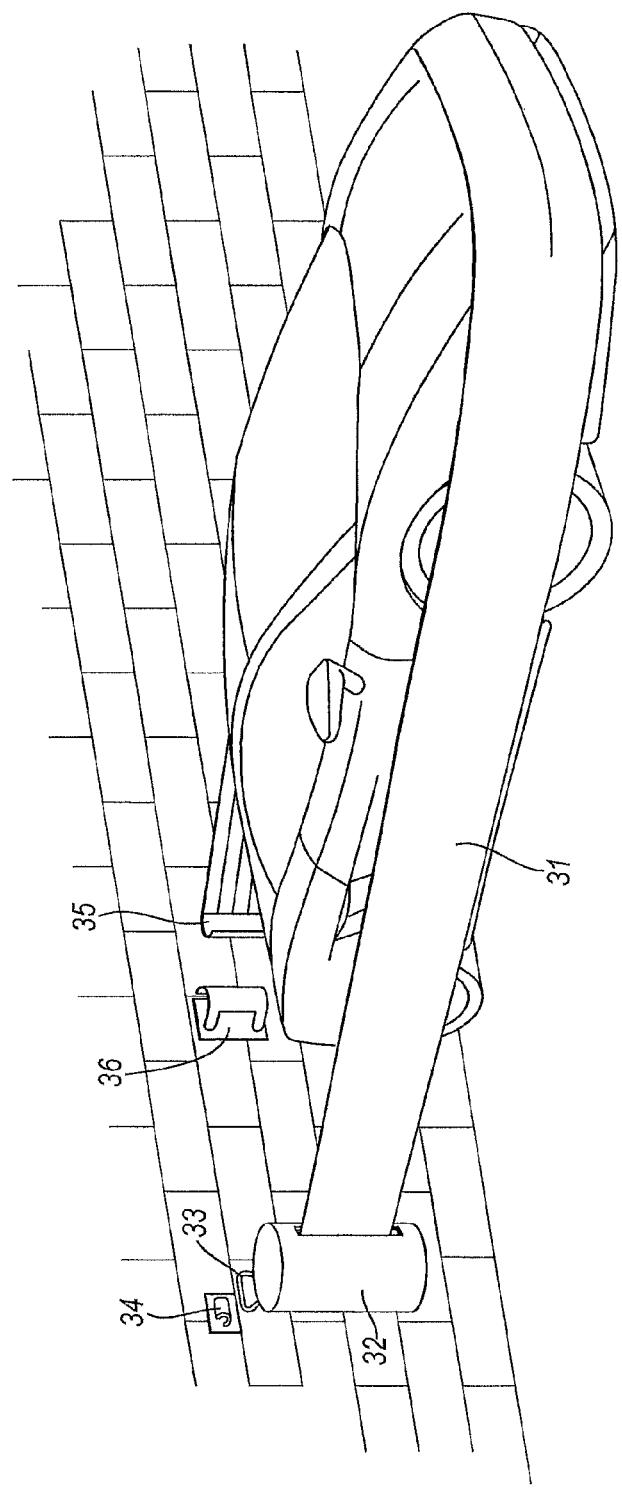
FIG. 2 is a device according to a second aspect of the invention.
Figure 3:
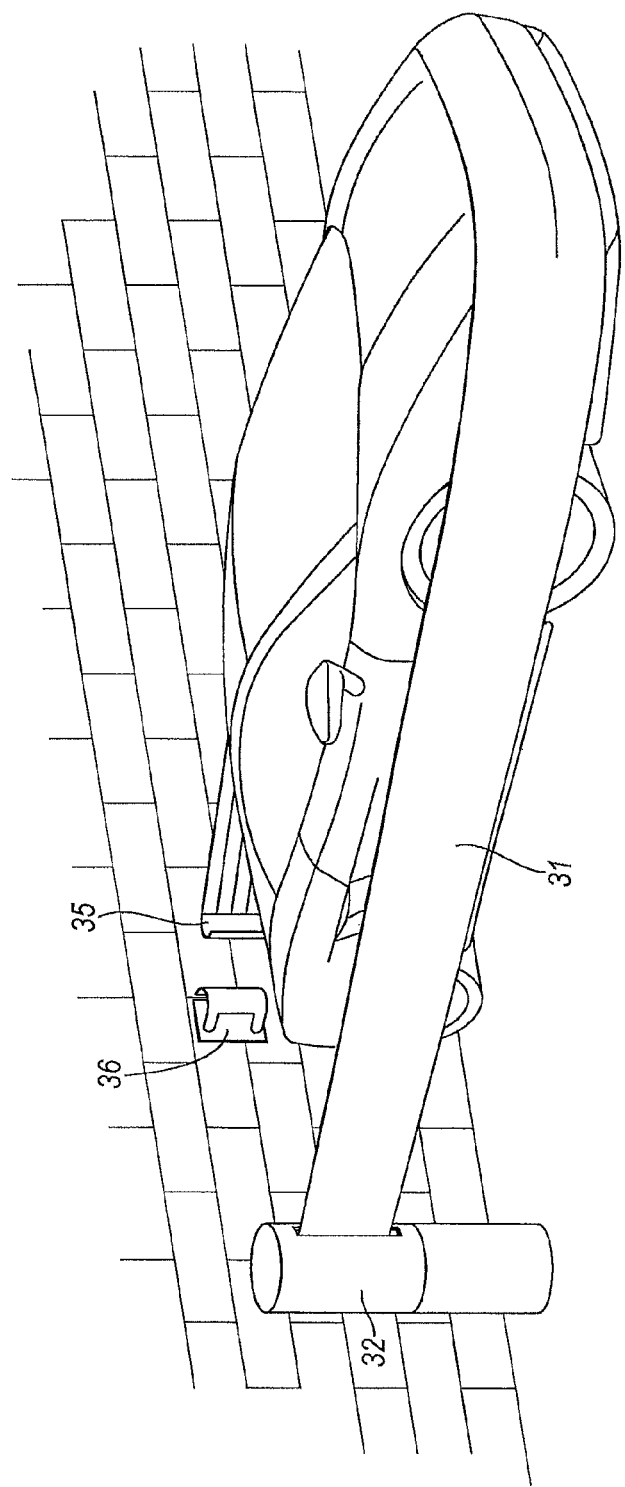
FIG. 3 is a device according to another aspect of the invention.

The device shown in FIG. 2 comprises a winch 32 for storing its strip 31, when not in use. The winch has a hook 33 for securing it to a wall bracket 34. The other end of the strip also has a hook 35, for another wall bracket 36. In this embodiment the strip is an elastomeric extrusion, but is otherwise similar in cross-section and material to the band shown in FIG. 1. The device is readily deployed by hooking the free end of the strip 31 onto the wall bracket, running the strip off the winch, hooking the winch onto the wall, tightening the strip and engaging a non-shown ratchet in the winch. A floor-mounted embodiment is depicted in FIG. 3.

The invention is not intended to be restricted to the details of the above described embodiments.

The invention claimed is:

1. A vehicle protection device comprising at least one strip of impact absorbing material and means for attaching the device temporarily in position along the sides, front, and rear of a vehicle, thereby completely encircling the vehicle, wherein the strip is in the form of a flexible resilient continuous band of rectangular cross-section and wherein the means for attaching is constituted by the resilience of the band and the length of the band, in its free state, being less than the circumference of the vehicle.

2. The vehicle protection device of claim 1, wherein the band is provided with a resilient section, of elasticised material.

3. The vehicle protection device of claim 1, wherein the band is formed of elastomeric material.

4. The vehicle protection device of claim 1, wherein the band is formed of foamed elastomeric material.

5. The combination of a vehicle and a vehicle protection device of claim 1, temporarily attached in position along the side of a vehicle, the band extending along the two sides of the vehicle and across the front and the rear thereof.

6. The combination of claim 5, wherein the band is smaller in its relaxed state than the circumference of the vehicle.

7. A vehicle protection device for use with a parked vehicle having one side, a front, a rear and an other side, said device comprising at least one strip of impact absorbing material wound onto a drum selected from a floor-mounted drum and a wall-mounted drum, the strip being in the form of a flexible resilient material, cooperating attachment means being provided on a free end of the strip and at a fixed position, enabling the strip to be unwound from the drum, placed along said one side, across one of said front and said rear and along said other side of said parked vehicle, with the free end of said strip being attached to the fixed position by said cooperating attachment means.

8. The vehicle protection device of claim 7, wherein the drum is in the form of a winch provided with a handle for rewinding, and with which the strip can be tightened around the vehicle.

9. A method of protecting a vehicle by use of a device according to claim 1.

10. A method of protecting a vehicle by use of a device according to claim 8.

* * * * *